United States Patent
Pan et al.

(10) Patent No.: US 9,828,654 B2
(45) Date of Patent: Nov. 28, 2017

(54) METHOD FOR DIRECTLY RECOVERING LEAD OXIDE USED FOR A LEAD-ACID BATTERY CATHODE FROM WASTE LEAD PASTE

(71) Applicants: CHILWEE POWER CO. LTD., Zhicheng, Changxing (CN); BEIJING UNIVERSITY OF CHEMICAL TECHNOLOGY, ChaoYang District, Beijing (CN)

(72) Inventors: Junqing Pan, Changxing (CN); Yongquan Ma, Changxing (CN); Yanzhi Sun, Changxing (CN); Xiaoxiang Cai, Changxing (CN); Yinjian Niu, Changxing (CN); Xiaowei Liu, Changxing (CN); Shuang Song, Changxing (CN); Tixian Chen, Changxing (CN); Guoqing Cao, Changxing (CN); Mingming Zhou, Changxing (CN); Xinxin Yang, Changxing (CN); Longrui Zhou, Changxing (CN); Yunfei Yang, Changxing (CN)

(73) Assignee: CHILWEE POWER CO. LTD & BEIJING UNIVERSITY OF CHEMICAL TECHNOLOGY (CN)

( * ) Notice: Subject to any disclaimer, the term of this patent is extended or adjusted under 35 U.S.C. 154(b) by 64 days.

(21) Appl. No.: 14/906,452

(22) PCT Filed: May 27, 2014

(86) PCT No.: PCT/CN2014/078489
§ 371 (c)(1),
(2) Date: Jan. 20, 2016

(87) PCT Pub. No.: WO2015/123930
PCT Pub. Date: Aug. 27, 2015

(65) Prior Publication Data
US 2016/0160316 A1 Jun. 9, 2016

(30) Foreign Application Priority Data
Feb. 21, 2014 (CN) .......................... 2014 1 0060387

(51) Int. Cl.
C22B 13/00 (2006.01)
C22B 3/00 (2006.01)
H01M 10/54 (2006.01)
C22B 7/00 (2006.01)

(52) U.S. Cl.
CPC ............ C22B 13/045 (2013.01); C22B 7/006 (2013.01); H01M 10/54 (2013.01); Y02P 10/234 (2015.11); Y02W 30/84 (2015.05)

(58) Field of Classification Search
CPC ...... C22B 13/045; C22B 7/006; H01M 10/54; Y02P 10/234; Y02W 30/84
USPC ............................................... 423/92; 429/49
See application file for complete search history.

(56) References Cited

U.S. PATENT DOCUMENTS

| | | | | |
|---|---|---|---|---|
| 7,507,496 B1 * | 3/2009 | Kinsbursky | ............ | C01G 21/06 29/2 |
| 8,562,923 B1 * | 10/2013 | Smith | .................. | C22B 13/045 423/619 |
| 2006/0018819 A1 * | 1/2006 | Olper | ........................ | C22B 3/44 423/434 |

FOREIGN PATENT DOCUMENTS

| | | | |
|---|---|---|---|
| CN | 101514395 | A | 8/2009 |
| CN | 102689921 | A | 9/2012 |
| CN | 102747227 | A | 10/2012 |
| CN | 102820496 | A | 12/2012 |
| CN | 103014347 | * | 4/2013 |
| CN | 103146923 | A | 6/2013 |
| CN | 103374657 | A | 10/2013 |
| CN | 103374658 | A | 10/2013 |
| CN | 103509949 | A | 1/2014 |
| WO | 2008056125 | A1 | 5/2008 |

OTHER PUBLICATIONS

Translation of CN-103014347, Apr. 2013.*
Partial translation of CN 103509949, Jan. 15, 2014.*
Guo Cui-Xiang, Zhao You-Cai, Review of Hydrometallurgical Processes for Recovering lead from scrap lead-acid batteries, Journal of Dongguan University of Technology, vol. 13, No. 1, Feb. 2006.

* cited by examiner

Primary Examiner — Steven Bos
(74) Attorney, Agent, or Firm — Maine Cernota & Rardin

(57) ABSTRACT

Provided is a method for directly recovering lead oxide used for a lead-acid battery negative electrode from waste lead paste. The method comprises: (1) contacting waste lead paste with a barium-containing desulphurizer under desulphurization reaction conditions, and performing a solid-liquid separation on the mixture after contacting to obtain a filtrate and a filtration residue; and (2) performing a conversion reaction on the above-mentioned filtration residue at a temperature of 350-750° C. so as to convert the lead-containing components in the filtration residue into lead oxide. In the method, the direct recovery of a lead oxide raw material applicable to a lead-acid battery negative electrode from waste lead paste is achieved by quantitatively replenishing a barium sulphate additive in the process of desulphuration thereby substantially decreasing the recovery cost and energy consumption, and improving the comprehensive utilization of waste lead paste.

14 Claims, No Drawings

METHOD FOR DIRECTLY RECOVERING LEAD OXIDE USED FOR A LEAD-ACID BATTERY CATHODE FROM WASTE LEAD PASTE

RELATED APPLICATIONS

This application is a national phase application filed under 35 USC §371 of PCT Application No. PCT/CN2014/078489 with an International filing date of 27 May 2014, which claims priority to Chinese Patent Application No. CN201410060387.X, filed 21 Feb. 2014. Each of these applications is herein incorporated by reference in their entirety for all purposes.

FIELD OF THE INVENTION

The present invention relates to a method for directly recovering lead oxide for negative electrode of lead-acid battery from waste lead paste.

BACKGROUND OF THE INVENTION

Since lead-acid batteries were invented by Plante, a French Engineer in 1859, they have been widely used as cheap and reliable secondary batteries in automobile, electric vehicle, energy storage, and other fields. As indicated in the latest statistics made by the Industrial Technology Research Institute of Taiwan, the consumption of lead-acid batteries has been taking a dominant share, though lead-acid batteries confront the competition from Li-ion batteries and nickel-hydrogen batteries in recent years. In 2012, the product value of secondary batteries in the world was USD 60.285 billion, wherein the product value of lead-acid batteries was USD 39.294 billion, accounting for 65.2% among the secondary batteries. According to the statistical data from the International Lead and Zinc batteries Study Group, in 2012, the lead consumption in the world was 10.62 million tons, about 82% of which was used for producing lead-acid batteries. According to the statistical data from China Nonferrous Metals Industry Association, in 2012, the total consumption of lead in China was 4.646 million tons, in which 3.3 million tons were used to produce lead-acid batteries. It is anticipated that waste and worn lead-acid batteries will be an important mineral asset of the society and increasingly become the principal raw material for lead smelting.

Before year 2000, lead smelting essentially employed a conventional sintering-blasting furnace process, which, in combination with fugitive emission of fume in some enterprises, resulted in severe $SO_2$ and lead dust pollution to the environment. A process of oxidizing in bottom blowing furnace and reduction smelting in blast furnace invented by some companies such as Henan Yuguang Gold & Lead Co., Ltd. and China ENFI Engineering Corporation solves the problem of pollution of $SO_2$ and lead dust in pyrometallurgy of lead, and has features such as short process flow and clean production. Though modern pyrometallurgy enables large-scale continuous production and is matured in technology, it involves pyrolytic smelting of lead-containing materials at 1100-1300° C., which not only brings a problem of high energy consumption, but also produces lead-containing dust in particle size equal to or smaller than PM2.5 by high temperature volatilization and lead-containing waste residue in the smelting process, consequently, the lead recovery rate is usually 95-97%.

To overcome the drawback of high energy consumption and lead emission in pyrometallurgy of lead, hydrometallurgy of lead is employed and regarded as a cleaner next-generation lead recovery process. Existing secondary lead hydrometallurgy processes, represented by hydrofluosilicic acid lead electrolysis, are unacceptable in industrial production owing to their high processing cost incurred by complex lead paste treatment process, high power consumption as high as 700-1,000 kWh/ton lead, and environmental pollution and equipment corrosion resulted from the fluorine-containing solution. Though a new process of direct PbO electrolysis in an alkaline environment reported by a research group led by Pan Junqing makes a great progress in raw material consumption, energy consumption of electrolysis, environmental pollution and other aspects, the lead recovery cost is almost close to that of the existing pyrometallurgy of lead. In years of engineering practice, it is found that the principal factor hindering the development of the new wet lead electrolysis process is still the cost, i.e., that process can't compete with an out-of-date and disordered direct pyrometallurgical recovery process without desulphurization employed in some small and medium-sized enterprises in terms of cost. In order to recycle waste and worn lead-acid batteries efficiently and thereby effectively realize regeneration and recycling of the lead resources, a breakthrough must be made out of the conventional concept of lead smelting that has dominated for thousands of years.

It can be found in the analysis of existing lead smelting enterprises that the lead provided in the existing pyrometallurgy of lead is 100% refined lead; whereas lead oxide is required as an active material in batteries in the modern lead-acid battery industry, and refined lead is required only in manufacturing plate grid and conducting tabs sectors. Therefore, while lead smelting enterprises consume a large quantity of energy and materials to smelt lead-containing materials (e.g., lead oxide) into crude lead and then electrolyze the crude lead into refined lead, the major customers—lead-acid battery manufacturers melt the refined lead into lead balls and then mill and oxidize the lead balls into lead oxide and use the lead oxide as an active material for lead-acid batteries. It can be seen that the lead smelting enterprises follow the lead smelting concept that has dominated for thousands of years but haven't taken consideration of the actual demand of their lead-acid battery customers for lead oxide. These enterprises have produced a large quantity of refined lead blindly and accordingly have consumed energy heavily and brought environmental pollution from smelting. Therefore, for the lead-acid battery industry in which the criteria for clean production and product quality become higher increasingly, the conventional lead pyrometallurgy industry must get out of the traditional concept that involves high energy consumption and severe pollution and replace the conventional lead smelting process with a direct lead oxide production process. For recycling of waste and worn lead-acid batteries, with the new concept, the pyrolytic smelting, electrolysis, and ball milling procedures, which involve high energy consumption and production of PM2.5 lead dust, lead skim, and toxic fluorides, can be omitted, and thereby the energy consumption can be reduced significantly, the recovery rate of lead can be improved greatly, and the cost of raw material for batteries can be reduced greatly. Ultimately, the waste and worn batteries recycled by battery manufacturers can be used as a raw material for producing new batteries.

The lead in lead-acid storage batteries mainly includes metallic lead in plate grids and conducting tabs and lead paste in the positive and negative poles, wherein, the recovering of the lead in the lead paste is the key in the entire recycling process. How to seek for an effective method to effectively and quickly convert the Pb (10-15 wt %), PbO (10-20 wt %), $PbO_2$ (25-35 wt %), and $PbSO_4$ (30-45 wt %) in the lead paste into PbO that can be used in the negative electrode or positive electrode in lead-acid batteries is a difficult task in the regenerative oxidation process of lead.

As disclosed in existing patent literature, trials have been made to prepare lead oxide from lead paste. For example, in CN201210121636.2, a raw material (e.g., sodium carbonate) and waste lead paste have a desulphurization reaction, then the desulphurized lead paste has a reaction with citric acid solution; next, through filtering, washing, and drying procedures, lead citrate is obtained; then, the lead citrate is calcined to obtain super-fine lead oxide. Though the target product in that invention is PbO, raw chemical materials such as citric acid, hydrogen peroxide, and sodium carbonate, etc. are consumed heavily. Therefore, that approach is uneconomical when viewed from the aspect of atom utilization.

In CN103374658A, super-fine lead oxide prepared from desulphurized lead paste through a three-stage process and a method for preparing the super-fine lead oxide are disclosed. The method comprises: procedure 1: acid leaching of desulphurized lead paste: the desulphurized lead paste has a reaction with an acid, while a reducing agent is added; after the reaction is completed, solid-liquid separation is carried out to obtain a lead-containing acid solution; procedure 2: preparation of lead carbonate: the lead-containing acid solution has a reaction with sodium carbonate, and then solid-liquid separation, washing, and drying are carried out to obtain lead carbonate; procedure 3: calcining: the lead carbonate is calcined to obtain super-fine lead oxide; the super-fine lead oxide can be PbO, $Pb_3O_4$, or a mixture of them. That method has the following features: nitric acid or acetic acid with hydrogen peroxide are used in procedure 1 for leaching; sodium carbonate is used in procedure 2 for desulphurization to obtain lead carbonate; lead carbonate is calcined and decomposed in procedure 3 to obtain lead oxide.

In CN102747227A, a method for preparing super-fine PbO from the active material in the poles of waste and worn lead-acid batteries is disclosed. The main principle of the method is to utilize a lead paste under the action of a reducing agent and other substances, dissolve the lead paste in nitric acid or hot hydrochloric acid solution, and then treat the lead paste with a water solution of metal hydroxide or ammonia, to obtain super-fine PbO powder for negative electrode of lead-acid battery. Likewise, a main drawback of that invention is: raw chemical materials including reducing agent, nitric acid, hydrochloric acid, and ammonia, etc. are consumed in the PbO preparation process; therefore, the PbO preparation process is uneconomical when viewed from the economic atom utilization aspect.

Similarly, in CN102820496A, a method for preparing a nanoscale lead compound from the lead paste in waste and worn lead-acid storage batteries is disclosed, comprising the following steps: (1) mixing lead paste, sodium acetate, and acetic acid with $H_2O_2$ in appropriate proportions, and controlling them to have a reaction for 6-10 h at 20-30° C. while stirring. After the reaction is completed, solid-liquid separation is carried out, and the pH of the solution is adjusted to 7.1-7.3, and then filtering is carried out to obtain lead acetate crystals; (2) calcining the lead acetate crystals for 2-3 h at 250-350° C., to obtain nanoscale PbO powder. Compared with the method disclosed in CN103374657A, in this method, citric acid is replaced with acetic acid that is cheaper. However, the problem of economic atom utilization still exists in this method.

Other relevant patent literatures include CN101514395A, and the method disclosed comprises: adding saturated oxalic acid solution into fine lead mud obtained from waste lead-acid storage batteries to have a reaction at 25-65° C., and then filtering to obtain a precipitate; treating the precipitate with excessive 30% nitric acid at 40-45° C., and then filtering to obtain a precipitate, and controlling the precipitate to have a reaction with 4 wt % ammonium carbonate solution at 25-65° C., and then filtering to obtain a precipitate; adding the precipitate into recycled $HNO_3$ and let the precipitate to dissolve at 40-45° C. till no gas bubble is produced anymore, and then filtering to obtain a filtrate, adding 25% ammonia into the filtrate to have a reaction, filtering to obtain a precipitate and washing the precipitate to neutral state, and finally drying and calcining the precipitate to obtain lead oxide.

As described above, waste lead paste mainly contains four components: Pb, PbO, $PbO_2$, and $PbSO_4$. The contents (weight percentages) of Pb, PbO, $PbO_2$, and $PbSO_4$ vary in different waste lead pastes, owing to the criterion for battery discarding and the battery recipes of different manufacturers. Usually, the contents are: 10-15 wt % of Pb, 10-20 wt % of PbO, 25-35 wt % of $PbO_2$, and 30-45 wt % of $PbSO_4$. Since the lead in the negative electrode of battery tends to be oxidized into PbO in the air in the battery disposal process, the content of Pb in the negative electrode is usually lower than that in the positive electrode, resulting in relatively excessive $PbO_2$. The existing process mainly consists of three stages: firstly, the Pb, PbO, $PbO_2$ and $PbSO_4$ in the lead paste are converted into soluble lead salt and $PbSO_4$. Secondly, the soluble lead salt and $PbSO_4$ are converted into lead citrate or $PbCO_3$, or the like. Thirdly, the lead citrate or $PbCO_3$ or lead acetate is calcined to obtain lead oxide.

It can be seen from the above description: for the target product, actually only the $PbSO_4$ in the lead paste has to be desulphurized to generate PbO, while all of the other three components (Pb, PbO, and $PbO_2$) are similar to PbO in structure, and PbO can be obtained by transferring the atom O. Unfortunately, in the existing methods, besides the lead sulfate is desulphurized by means of citric acid and then calcined for conversion, the rest three components are treated by complex acid leaching first (e.g., $H_2O_2$+acetic acid pre-reduction is carried out to generate $(CH_3CO_2)_2Pb)$, then treated by $Na_2CO_3$ re-precipitation to generate $PbCO_3$, and finally $PbCO_3$ is calcined to obtain PbO. Owing to the fact that the target product is PbO, all the raw materials added in that process, including $H_2O_2$, $CH_3COOH$, and $Na_2CO_3$, etc., are wasted, which is uneconomical when viewed from the economic atom utilization aspect.

The research group led by Pan Junqing has made further research for improving economic atom utilization in the secondary lead conversion process, and has disclosed a novel method for utilizing the lead paste in lead-acid batteries in CN103146923A. That method comprises the following five procedures: 1. heating the lead paste in lead-acid battery and lead powder to have a solid-phase mixing reaction; 2. carrying out alkaline desulphurization in NaOH solution A; 3. leaching the desulphurized product with NaOH solution B, to obtain lead-containing alkaline solution and filter residue, and then treating by purification and cooling crystallization to obtain lead oxide; 4. utilizing NaOH solution C to carry out recrystallization to obtain PbO crystals at a higher purity; 5. after desulphurization, adding NaOH in the NaOH solution A to precipitate sodium sulfate crystals; in that approach, a NaOH desulphurization cycle is created, with sodium sulfate as a byproduct. The features of that method include: for the four components of lead paste, firstly, Pb and $PbO_2$ are utilized to directly obtain PbO in solid state, and the excessive $PbO_2$ in the waste lead paste is consumed by adding Pb; secondly, only the $PbSO_4$ in the lead paste is desulphurized to generate PbO and $Na_2SO_4$; finally, NaOH solution is utilized to control the PbO to conduct recrystallization, and thereby purer PbO solid is obtained. That method utilizes an atom-economic reaction between Pb and $PbO_2$ and purifies PbO by recrystallization in NaOH solution. The raw material NaOH, which is mainly consumed, is only used for desulphurization of the $PbSO_4$ in the lead paste. Thus, unlike other processes in which all components in the lead paste are converted into lead salt and then desulphurized, the process disclosed in that patent document exploits a novel lead oxide recovery technique from the aspect of economic atom utilization. Through more than one year of research made by the research group, it is found that the method still has many drawbacks that must be eliminated by further innovation, including:

1. Long process flow: five procedures are required in that process, in which three NaOH solutions have to be used for cyclic processing, wherein, the NaOH solution A is used for desulphurization, the NaOH solution B is used for leaching, and the NaOH solution C is used for recrystallization and NaOH is added for precipitating sodium sulfate. Therefore, it is very necessary to simplify the process and thereby reduce the recovery cost and energy consumption.

2. $PbSO_4$ doesn't participate in the reaction before/after heating, in the high-temperature solid-phase conversion of the lead paste in the first stage. The $PbSO_4$, which accounts for 30-45 wt % of the total weight of the lead paste, is mingled with Pb and $PbO_2$ and is heated up meaninglessly, resulting in energy waste; in addition, a great deal of lead sulfate included in the lead paste results in incomplete solid-phase contact reaction between Pb and $PbO_2$, and consequently a considerable amount of Pb or $PbO_2$ particles remain in the product. Hence, it is of particular importance to eliminate the adverse effect of $PbSO_4$ or convert $PbSO_4$ into a precursor of PbO before the heat treatment.

3. As for the existing process, a PbO product can be obtained through four procedures, i.e., calcining—desulphurization—leaching—crystallization. Such a process is very long. More severely, some useful additives in the waste lead paste, such as super-fine barium sulfate, are abandoned as impurities in the process. It is well known that super-fine barium sulfate is added as a swelling agent in the lead paste of negative electrode in the existing production of lead-acid batteries, in order to improve the service life of the negative electrode plate of lead-acid battery. The residual barium sulfate in the waste lead paste should be utilized appropriately to directly produce PbO containing a specific amount of barium sulfate as negative electrode composite material required for production of negative electrodes of lead-acid batteries, thereby utilizing the two components (lead oxide and barium sulfate) in the waste lead paste in an integrated manner.

In summary, it is an urgent task to invent an innovative short process to quickly obtain a PbO complex and keep the barium sulfate component in the lead paste as a useful additive for lead oxide, and, on that basis, add barium sulfate in appropriate amount to meet the demand for production of an active material for negative electrodes of lead-acid batteries. In such a way, not only the lead component in the lead paste can be utilized, but also the barium sulfate additive can be recovered, and thereby the overall recycling value of lead paste can be greatly improved.

SUMMARY OF THE INVENTION

The object of the present invention is to provide an innovative method for recovering barium sulfate-containing lead oxide as lead oxide for negative electrode of lead-acid battery directly from waste lead paste, which overcomes the drawbacks in the existing process of recovering lead oxide from waste lead paste in the prior art, i.e., the prior process flow is long and the barium sulfate additive can not be utilized.

The present invention provides a method for directly recovering lead oxide for negative electrode of lead-acid battery from waste lead paste, comprising the following steps:

(1) controlling waste lead paste to contact with a barium-containing desulfurizing agent under desulphurization reaction conditions, and carrying out solid-liquid separation for the mixture obtained from the contact reaction, to obtain filtrate and filter residue;

(2) controlling the filter residue to have a conversion reaction at 350-750° C. temperature, to convert the lead-containing components in the filter residue into lead oxide.

The method provided in the present invention has the following major advantages:

(1) by treating the waste lead paste through a desulphurization procedure first and then through a pyrolytic conversion procedure, the meaningless heat energy consumption resulted from lead sulfate accounting for 30-45 wt % of the waste lead paste as a heat bearer is effectively avoided;

(2) a drawback of incomplete reaction of Pb and $PbO_2$ incurred by a great deal of lead sulfate mingled with Pb and $PbO_2$ in the lead paste is eliminated;

(3) the $Pb(OH)_2$ component generated in the pre-desulphurization procedure of lead sulfate can be thermally decomposed taking full advantage of the heat provided in a typical atom-economic reaction of $Pb+PbO_2=2PbO$, so that an effect of converting Pb—$PbO_2$, $Pb(OH)_2$ and excessive $PbO_2$ in the lead paste together into PbO in one step of thermal conversion reaction is attained, and thereby an effect of recovering PbO only through two procedures (pre-desulphurization and atom-economic conversion) is attained ultimately;

(4) through pre-desulphurization of the waste lead paste for lead sulfate removal, the $PbO_2$ activity in the desulphurized lead paste is improved, and the $PbO_2$ with improved activity can oxidize organic additives such as humic acid and sodium lignosulphonate, etc. in the waste lead paste in the conversion procedure in step (2); the high activity of $PbO_2$ may be a result from a larger active surface exposed after a great deal of tight lead sulfate originally on the surface is removed in the lead paste and thereby the oxidizing property is improved;

(5) the active material in the positive electrode of lead-acid battery doesn't contain barium sulfate, while the active material in the negative electrode usually contains 0.5-1.5% barium sulfate additive; through a desulphurization and conversion process, PbO powder is obtained from the waste lead paste in the positive electrode and negative electrode poles, and the content of barium sulfate in the PbO powder is diluted to a certain degree, usually as low as 0.2-0.8%, owing to the existence of PbO after the lead paste in the positive electrode pole is converted. Battery experiments have shown that the accurate barium sulfate content in the PbO obtained through such a recovery process can be ascertained by analysis, and, after barium sulfate is added in an appropriate amount according to the demand of battery negative electrode recipe, the obtained PbO can be used as a raw material for negative electrodes of new lead-acid batteries.

On that basis, in the present invention, an appropriate amount of soluble barium compound and/or barium sulfate are/is added to the alkaline desulfurizing liquid NaOH, KOH, or a mixed solution of NaOH and KOH, and, by utilizing a mechanical stirring or ball mill mixing action in the desulfurization procedure, the added soluble barium compound and/or barium sulfate are/is directly added into the lead paste in the form of a barium sulfate additive finally.

A preferred method disclosed in the present invention is an innovative method that can effectively supplement barium sulfate in the desulphurization procedure of waste lead paste. The method involves: the desulfurizing agent used in step (1) is NaOH and/or KOH solution that contains soluble barium compound and/or barium sulfate. A more preferred method is to dissolve a soluble barium compound in the alkaline desulfurizing agent NaOH and/or KOH solution, and the soluble barium compound is preferably selected from one or more of barium hydroxide, barium nitrate, barium perchlorate, barium chloride, and barium acetate, wherein, the concentration (weight percentage) of the soluble barium compound is preferably 0.001-15% (based on the total weight of the desulfurizing agent). That method utilizes the sulfate ions in the lead sulfate and the barium ions provided by the soluble barium compound to have an ionic precipitation reaction, and thereby barium sulfate precipitate, which is more indissoluble than lead sulfate, is obtained. Experiments have shown: the effect will be stronger if the soluble barium compound contained in the desulfurizing agent is barium hydroxide, possibly resulted from the following reaction:

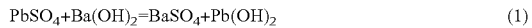

$$PbSO_4 + Ba(OH)_2 = BaSO_4 + Pb(OH)_2 \quad (1)$$

It is seen from the reaction formula (1) that barium hydroxide can exert desulphurization and barium sulfate addition effects at the same time.

Moreover, in step (1) of the present invention, the desulphurization procedure of waste lead paste can be implemented by means of the existing stirring process in a reactor. In a preferred embodiment of the present invention, a wet ball milling process is used to implement the desulphurization procedure in step (1), and thereby the following advantages are obtained:

(1) A single-step ball milling and desulphurization process is employed to overcome a drawback that two procedures (pre-milling and stirred desulphurization in a reactor of waste lead paste) are required in the prior art. Owing to the fact that the waste lead paste usually contains sulfuric acid component included in lead-acid battery, 10-50 ppm Fe impurity is often carried into the waste lead paste in the mechanical pre-milling procedure in the prior art, which has a direct impact on the quality of the recovered lead oxide powder. Through a ball milling and desulphurization process in alkaline NaOH and/or KOH solution in the innovative process disclosed in the present invention, not only two functions (pre-milling and stirred desulphurization) for the waste lead paste are directly implemented in one ball-milling reactor, but also the lead-containing mill dust in the mechanical milling process in the prior art is significantly avoided, and thereby an environmental protection effect is attained.

(2) With zirconium balls or agate balls as the abrasive material under an alkaline condition, inclusion of contaminating metals (e.g., Fe) can be effectively prevented, and thereby a process basis for producing high-grade lead oxide is provided.

(3) Through a wet ball milling procedure, not only the Pb and $PbO_2$ components in the waste lead paste are mixed fully, but also a part of Pb and $PbO_2$ have a small quantity of atom-economic reaction and conversion in the ball milling contact process, which is helpful for the follow-up quick and thorough atom-economic reaction and can save the time required for the atom-economic reaction at a high temperature.

Though Pb and $PbO_2$ can be converted into PbO through an atom-economic reaction at a high temperature, in order to further speed up the reaction and improve the extent of reaction between Pb and $PbO_2$, a promoter for atom-economic reaction is added in the desulphurization and conversion procedure of lead paste in step (1) or the procedure in step (2), to promote the Pb and $PbO_2$ in the lead paste to be converted to PbO more quickly.

Through further in-depth research, the inventor of the present invention has found: by cooling the material after the atom-economic conversion at a specific cooling rate, not only the $Pb_3O_4$ byproduct produced from PbO oxidation by oxygen in the air in the cooling process can be eliminated, but also the agglomeration of the material at a high temperature can be alleviated, and thereby the required follow-up milling time can be shortened. The method disclosed in the present invention further employs direct mist cooling for PbO at a high temperature, i.e., utilizes the intense heat absorption and cooling effect and dual cracking effects of gas generated by gasification of 2-50 μm liquid mist on PbO surface; thus, not only the PbO cooling is accelerated, but also the pyrolytic decomposition of the PbO material is promoted. Usually, the amount of mist spraying is 0.3-50 wt % of the lead oxide, and the coolant is preferably one or more of water, ethanol, methanol, and acetone. The mist spraying is stopped when the temperature drops to 100-240° C.

In subsequent in-depth experiments, by supplementing NaOH and/or KOH to the desulphurized filtrate, the concentration of NaOH and/or KOH is recovered to 90-150% of the initial concentration in step (1); thus, precipitable sodium sulfate and/or potassium sulfate product can be obtained directly, and NaOH and/or KOH solution that can be cyclically used for desulphurization in step (1) can be obtained, and thereby cyclic utilization of NaOH and/or KOH material and crystallization of sodium sulfate and/or potassium sulfate without evaporation can be implemented.

DETAILED DESCRIPTION OF THE EMBODIMENTS

Hereunder the present invention will be detailed in some embodiments. It should be appreciated that the embodiments described here are only provided to describe and explain the present invention, but shall not be deemed as constituting any limitation to the present invention.

According to the present invention, a method for directly recovering lead oxide for negative electrode of lead-acid battery from waste lead paste is provided, comprising the following steps:

(1) controlling waste lead paste to contact with a desulfurizing agent under desulphurization reaction conditions, and carrying out solid-liquid separation for the mixture obtained from the contact reaction, to obtain filtrate and filter residue;

(2) controlling the filter residue to have a conversion reaction at 350-750° C. temperature, to convert the lead-containing components in the filter residue into lead oxide.

In the method according to the present invention, in step (1), the process of contact between the waste lead paste and the desulfurizing agent can be implemented through a conventional desulphurization process in a reactor, or implemented through a wet ball milling process, for the purpose of quickly milling large particles in the lead paste and attaining an effect of removing lead sulfate completely from the waste lead paste.

The inventor of the present invention has found: by controlling the waste lead paste and the desulfurizing agent (in particular, NaOH solution) to mix and contact in the wet ball milling process, the yield rate of PbO and the purity of PbO product can be greatly improved subsequently, and the time required for the contact in the follow-up step (1) can be shortened. Therefore, preferably the contact between the waste lead paste and the desulfurizing agent in the present invention is implemented by means of a wet ball milling and mixing process. The ball milling conditions preferably include: based on 1,000 g waste lead paste, the mass of the balls is 5-500 g, more preferably 3-300 g, the number of the balls is 5-100, the ball milling time is 0.1-200 min, more preferably 0.5-60 min, the ball milling reaction temperature is controlled at −5° C. to 105° C., more preferably 10-80° C. The balls are preferably zirconium balls or agate balls.

In the present invention, the desulfurizing agent can be any known material that can have a reaction with lead sulfate in waste lead paste to generate soluble sulfate and lead oxide or lead hydroxide in the art, and preferably is NaOH and/or KOH solution, more preferably is NaOH solution. The concentration of the NaOH and/or KOH solution is preferably 4-23 wt %.

In a preferred embodiment according to the present invention, as the desulfurizing agent, the NaOH and/or KOH solution further contains soluble barium compound and/or barium sulfate. Based on the total weight of the desulfurizing agent, the content of the soluble barium compound and/or barium sulfate can be 0.001-15 wt %. In the present invention, the soluble barium compound can be one or more of barium hydroxide, barium nitrate, barium perchlorate, barium chloride, and barium acetate, and is preferably barium hydroxide. If the NaOH and/or KOH solution that serves as the desulfurizing agent contains barium hydroxide, the barium hydroxide can attain dual effects of desulphurization and barium sulfate addition.

Though high-concentration sodium sulfate and/or potassium sulfate solution can be directly obtained from high-concentration alkaline solution (e.g., NaOH and/or KOH solution) after the reaction, it is difficult to fully disperse the waste lead paste in too little NaOH and/or KOH solution; consequently, the material will be very viscous in the stirring process. Through a large quantity of experiments, it is determined that the concentration of the NaOH and/or KOH solution in the present invention is preferably 4-23 wt %, to maintain an appropriate solid-liquid ratio between the NaOH and/or KOH and the waste lead paste and appropriate stirring viscosity and obtain mother liquid of sodium sulfate and/or potassium sulfate at appropriate concentration.

In step (1), usually a specific amount or slightly excessive amount of desulfurizing agent (preferably NaOH and/or KOH solution) is used according to the content of lead sulfate in the lead paste. Usually, the stoichiometric ratio is 101-150%. If the added amount of desulfurizing agent is inadequate, some $PbSO_4$ will remain, and the desulphurization effect will be compromised; if the added amount of desulfurizing agent is excessive, the residual desulfurizing agent will cause PbO dissolution and increased Pb content in the filtrate; in addition, excessive desulfurizing agent will cause decreased content of sodium sulfate and/or potassium sulfate in the mother liquid and decreased recovery rate of sodium sulfate and/or potassium sulfate per cycle in the follow-up procedures, or an additional evaporation procedure is required to ensure sodium sulfate can precipitate sufficiently.

In the method according to the present invention, the lead conversion process in step (2), in which an atom-economic conversion reaction is the core, mainly involves the following three reactions:

(1) Pb and $PbO_2$ in the filter residue generate PbO through an atom-economic reaction;
(2) Residual $PbO_2$ is decomposed into PbO;
(3) $Pb(OH)_2$ obtained by desulphurization is decomposed into PbO.

The inventor of the present invention has found: if the reaction time in step (2) is controlled within 3-70 min, preferably within 5-40 min, the Pb—$PbO_2$, $Pb(OH)_2$, and residual $PbO_2$ can be converted into PbO fully.

In the method according to the present invention, the conversion reaction in step (2) preferably is carried out in existence of a promoter for atom-economic reaction. The existence of the promoter for atom-economic reaction can promote converting the waste lead paste after desulphurization into PbO quickly and completely, and can shorten the conversion time required in step (2). The promoter for atom-economic reaction can be added in step (1) and/or step (2).

In the present invention, the promoter for atom-economic reaction can be any substance that can react with $PbO_2$ to generate PbO, for example, the promoter for atom-economic reaction can be one or more of metal powder, carbon powder, naphthalene, camphor, urea, and active carbon containing 0.5-95 wt % PbO, or a mixture of one or more of the above-mentioned substances and β-lead peroxide mixed at any mix ratio. The metal powder can be one or more of lead powder, barium powder, zinc powder, sodium powder, lithium powder, potassium powder, aluminum powder, magnesium powder, manganese powder, tin power, nickel powder, and stibium powder. More preferably, the particle diameter of the promoter for atom-economic reaction is controlled at 80-600 meshes.

In a preferred embodiment according to the present invention, the promoter for atom-economic reaction is a mixture of lead powder and β-lead peroxide, and the weight ratio of lead powder to β-lead peroxide is 1:0.05-2. With the preferred promoter for atom-economic reaction, the reaction can be carried out quickly, and the cost is low.

The dosage of the promoter for atom-economic reaction can be selected as required, as long as it ensures that the above-mentioned conversion process can be executed fully. Preferably, the dosage of the promoter for atom-economic reaction is 0.05-30 wt % of the total weight of the filter residue obtained in step (1), more preferably 0.5-25 wt %, further more preferably 1-20 wt %.

The inventor of the present invention has found: in the case that the desulfurizing agent is NaOH and/or KOH solution, by adding NaOH and/or KOH into the filtrate obtained in step (1) to increase the concentration of NaOH and/or KOH in the filtrate to 90-150% of the concentration before the contact, the sodium sulfate and/or potassium sulfate generated in the desulphurization reaction in step (1) can precipitate directly, and thereby sodium sulfate and/or potassium sulfate product can be obtained through a simple solid-liquid separation procedure, and the filtrate (NaOH and/or KOH solution) can be directly recycled and reused. Accordingly, preferably the method provided in the present invention further comprises: supplementing NaOH and/or KOH into the filtrate obtained in step (1), and controlling the concentration of NaOH and/or KOH in the obtained filtrate to 90-150% of the concentration before the contact.

Moreover, the inventor of the present invention has found: by cooling the conversion product obtained in step (2) at an appropriate cooling rate, on one hand, the crystal form of the PbO product can be mainly kept as α-structure, on the other hand, PbO oxidation can be prevented. Accordingly, preferably the method provided in the present invention further comprises: cooling the product obtained in step (2) to 100-300° C. within 0.5-30 min, more preferably cooling to 100-150° C. within 1-10 min. More preferably, the cooling method is liquid mist cooling, so as to obtain a better cooling effect, wherein, the coolant is preferably one or more of water, methanol, ethanol, and acetone. In the liquid mist cooling procedure, the size of the mist droplets is preferably 2-50 μm.

With the method provided in the present invention, waste lead paste can be converted efficiently into lead oxide that can be used for negative electrodes of lead-acid batteries, and, not only the energy consumption in the conversion process can be reduced significantly, but also the barium sulfate in the waste lead paste can be recovered in the recovering process and used as an additive for negative electrodes of new lead-acid batteries. Since an atom-economic reaction is the core in the entire process, the consumption of other chemical raw materials is avoided as far as possible; in addition, by using the mother liquid of desulphurization cyclically, the secondary pollution to the environment resulted from emission of lead-containing waste liquid is avoided, and totally-enclosed, continuous, and clean industrial production is realized. Hereunder the present invention will be further detailed in some examples.

Example 1

This example is provided to explain the method for directly recovering lead oxide from waste lead paste of lead-acid batteries used in electric vehicles in the present invention.

Crush 12V, 12 Ah waste and worn batteries used in electric vehicles to obtain waste lead paste, weigh 2 kg waste lead paste as the sample to be used in this example; through analysis, it is determined that the weight percentages of the main components in the waste lead paste are: 21% PbO, 9% Pb, 37% $PbSO_4$, 31% $PbO_2$, and 0.5% $BaSO_4$, and the remaining part is sulfuric acid solution of 12 wt % concentration; the lead compounds in the waste lead paste are equivalent to 7.79 mol PbO.

The lead oxide recovery process is as follows:
(1) mix the 2 kg waste lead paste with 2 L NaOH solution of 8.9 wt % concentration at 35° C., and carry out ball milling (based on 1,000 g waste lead paste, the mass of the balls is 300 g, agate balls are used) for 10 min, and then filter to obtain filtrate and filter residue;
(2) heat up the filter residue to 490° C. using a temperature programming method with a heating rate of 5° C./min keep the reaction at 490° C. for 120 min, to ensure the reaction to be carried out homogeneously and fully;
(3) cool the product obtained in step (2) by water mist cooling within 1 min (the size of water mist droplets is 2-30 μm) to 150° C., and stop water spraying at that temperature;
(4) supplement NaOH into the filtrate obtained in step (1), till the NaOH concentration in the filtrate reaches 105% of the concentration before the contact, to enable the sodium sulfate in the filtrate to precipitate, and then carry out solid-liquid separation. 0.4 kg sodium sulfate crystals of 99.3% purity are obtained through solid-liquid separation, while a part of sodium sulfate remains in the NaOH desulfurizing liquid. After concentration adjustment, the NaOH solution can be reused in step (1).

Crush the product obtained in step (3) and sieve it through a 300 meshes sieve screen, to obtain 1.73 kg recovered PbO sample. Through ICP analysis, it is ascertained that the sample contains 0.55% barium sulfate. Through calculation, it is ascertained that the lead recovery rate is 99.6%, and the barium sulfate recovery rate is 95.5%.

Example 2

This example is provided to explain that the NaOH solution obtained in step (4) in Example 1 in the present invention is reused in the desulphurization procedure in step (1).

Weigh another 2 kg waste lead paste that is the same as the waste lead paste in Example 1. The cyclic PbO recovery process is as follows:
(1) carry out ball milling and mixing for the waste lead paste of lead-acid battery and all NaOH solution obtained in step (4) in Example 1 (through titrimetric analysis, it is ascertained that the concentration of the NaOH solution is 9.5 wt %) for 30 min (based on 1,000 g waste lead paste, the mass of the balls is 130 g, and zirconium dioxide balls are used), and add 10.4 g 300 meshes lead powder and 6.0 g 300 meshes β-$PbO_2$ (chemically pure) as a promoter for atom-economic reaction in the ball milling process, and then filter to obtain filtrate and filter residue;
(2) heat up the filter residue to 490° C. using a temperature programming method with a heating rate of 10° C./min, keep the reaction at 490° C. for 20 min, to ensure the reaction to be carried out homogeneously and fully;
(3) cool the product obtained in step (2) by water mist cooling within 1 min. (the size of water mist droplets is 2-30 μm) to 150° C., and stop water spraying at that temperature;
(4) supplement NaOH into the filtrate obtained in step (1), till the NaOH concentration in the filtrate reaches 105% of the concentration before the contact, to enable the sodium sulfate in the filtrate to precipitate, and then carry out solid-liquid separation. 0.55 kg sodium sulfate crystals of 99.2% purity are obtained through solid-liquid separation, while a part of sodium sulfate remains in the NaOH desulfurizing liquid. After concentration adjustment, the NaOH solution can be reused in step (1).

Crush the product obtained in step (3) and sieve it through a 300 meshes sieve screen, to obtain 1.75 kg recovered PbO sample. Through ICP analysis, it is ascertained that the sample contains 0.55% barium sulfate. Through calculation, it is ascertained that the lead recovery rate is 99.8%, and the barium sulfate recovery rate is 96.2%.

Example 3

Weigh another 2 kg waste lead paste that is the same as the waste lead paste in Example 1. The composition of the waste lead paste is shown in Example 1.

The lead oxide recovery process is as follows:
(1) mix the 2 kg waste lead paste with 2 L KOH solution of 13 wt % concentration at 40° C., and carry out ball milling (based on 1,000 g waste lead paste, the mass of the balls is 300 g, agate balls are used) for 10 min, and then filter to obtain filtrate and filter residue;

(2) add 1.2 g 300 meshes carbon powder and 0.5 g naphthalene into the filter residue and mix homogeneously, heat up the mixture to 490° C. using a temperature programming method with a heating rate of 5° C./min, keep the reaction at 490° C. for 40 min, (3) cool the product obtained in step (2) by water mist cooling within 1 min (the size of water mist droplets is 20-30 μm) to 150° C., and stop water spraying at that temperature;

(4) supplement KOH into the filtrate obtained in step (1), till the KOH concentration in the filtrate reaches 101% of the concentration before the contact, to enable the potassium sulfate in the filtrate to precipitate, and then carry out solid-liquid separation. 0.28 kg potassium sulfate crystals of 99.3% purity are obtained through solid-liquid separation, while a part of potassium sulfate remains in the KOH filtrate. After concentration adjustment, the KOH filtrate can be reused in step (1).

Crush the product obtained in step (3) and sieve it through a 300 meshes sieve screen, to obtain 1.732 kg recovered PbO sample. Through ICP analysis, it is ascertained that the sample contains 0.56% barium sulfate. Through calculation, it is ascertained that the lead recovery rate is 99.7%, and the barium sulfate recovery rate is 96.8%.

Example 4

Lead oxide is recovered from the waste lead paste with the method described in Example 3, except that 20 g 300 meshes lead powder is added in step (2) as a promoter for atom-economic reaction. In that way, 1.75 kg recovered PbO sample is obtained. Through ICP analysis, it is ascertained that the sample contains 0.55% barium sulfate. Through calculation, it is ascertained that the lead recovery rate is 99.6%, and the barium sulfate recovery rate is 96.2%.

Example 5

Lead oxide is recovered from the waste lead paste with the method described in Example 3, except that 4 g 300 meshes carbon powder, 0.3 g 120 meshes aluminum powder, and 1 g urea are added in step (2) as a promoter for atom-economic reaction. In that way, 1.73 kg recovered PbO sample is obtained. Through ICP analysis, it is ascertained that the sample contains 0.56% barium sulfate. Through calculation, it is ascertained that the lead recovery rate is 99.5%, and the barium sulfate recovery rate is 96.9%.

Example 6

Take 2 kg waste lead paste that is the same as the waste lead paste used in Example 1. The contents (weight percentages) of the components in the waste lead paste are: 21% PbO, 9% Pb, 37% $PbSO_4$, 31% $PbO_2$, and 0.5% $BaSO_4$, and the remaining part is sulfuric acid solution of 12 wt % concentration. The lead compounds in the waste lead paste are equivalent to 7.79 mol PbO.

The lead oxide recovery process is as follows:
(1) mix the 2 kg waste lead paste with 2 L desulfurizing agent at 35° C., wherein, the desulfurizing agent is NaOH solution of 8.8 wt % concentration, in which 8 g barium hydroxide is added; then, carry out ball milling (based on 1,000 g waste lead paste, the mass of the balls is 300 g, agate balls are used) for 10 min, and then filter to obtain filtrate and filter residue;

(2) heat up the filter residue to 510° C. using a temperature programming method with a heating rate of 5° C./min, keep the reaction at 510° C. for 60 min, to ensure the reaction to be carried out homogeneously and fully;

(3) cool the product obtained in step (2) by water mist cooling within 1 min (the size of water mist droplets is 2-30 μm) to 120° C., and stop water spraying at that temperature;

(4) supplement NaOH into the filtrate obtained in step (1), till the NaOH concentration in the filtrate reaches 105% of the concentration before the contact, to enable the sodium sulfate in the filtrate to precipitate, and then carry out solid-liquid separation. 0.4 kg sodium sulfate crystals of 99.3% purity are obtained through solid-liquid separation, while a part of sodium sulfate remains in the NaOH desulfurizing liquid. After concentration adjustment, the NaOH solution can be reused in step (1).

Crush the product obtained in step (3) and sieve it through a 300 meshes sieve screen, to obtain 1.73 kg PbO sample. Through ICP analysis, it is ascertained that the recycled PbO contains 0.99% barium sulfate. Through calculation, it is ascertained that the lead recovery rate is 99.6%, and the barium sulfate recovery rate is 96%.

Preferred embodiments of the present invention are described above in detail, however, the present invention is not limited to the specific details of the above embodiments, technical solutions of the present invention may have various simple modifications within the technical spirit of the present invention, and these simple modifications belong to the scope of the present invention.

In addition, it should be noted that each specific technical characteristic described in the above specific embodiments can be combined in any suitable manner, without contradictory situation. In order to avoid unnecessary repetition, various possible combinations are not further explained in the present invention.

Moreover, various embodiments of the present invention may also be combined in any suitable manner, as long as it will not depart from the idea of the present invention, and the combinations should be regarded as the disclosure of the present invention.

The invention claimed is:

1. A method for directly recovering lead oxide for negative electrode of lead-acid battery from waste lead paste, comprising the following steps:
   (1) controlling waste lead paste to contact with a barium-containing desulfurizing agent to desulfurize through wet ball milling, and carrying out solid-liquid separation for a mixture obtained from the contact, to obtain filtrate and filter residue;
   (2) controlling the filter residue to have a conversion reaction at 350-750° C., to convert lead-containing components in the filter residue into lead oxide, thereby obtaining a product of lead oxide and barium sulfate;
   wherein the barium-containing desulfurizing agent is NaOH and/or KOH solution containing soluble barium compound and/or barium sulfate and the concentration of the NaOH and/or KOH solution is 4-23 wt %.

2. The method according to claim 1, wherein based on the total weight of the barium-containing desulfurizing agent, the content of the soluble barium compound and/or barium sulfate is 0.001-15 wt %.

3. The method according to claim 1, wherein the soluble barium compound is one or more of barium hydroxide, barium nitrate, barium perchlorate, barium chloride, and barium acetate.

4. The method according to claim 1, wherein the conversion reaction in step (2) is carried out in the presence of a promoter, which is added in step (1) and/or step (2).

5. The method according to claim 4, wherein the promoter is selected from the group consisting of lead powder, barium powder, aluminum powder, sodium powder, lithium powder, potassium powder, magnesium powder, nickel powder, tin powder, stibium powder, zinc powder, naphthalene, camphor, urea, carbon powder, active carbon containing 0.5-95 wt % PbO, and a mixture of the above-mentioned substances with β-lead peroxide mixed at any mix ratio.

6. The method according to claim 4, wherein the dosage of the promoter is 0.05-30 wt % of the filter residue obtained in step (1).

7. The method according to claim 1, further comprising: supplementing the barium-containing desulfurizing agent into the filtrate obtained in step (1), and controlling the concentration of the barium-containing desulfurizing agent in the obtained filtrate to 90-150% of the concentration before the contact.

8. The method according to claim 1, further comprising: cooling product obtained in step (2) to 100-300° C. within during a period of 0.5-30 min following the completion of step (2).

9. The method according to claim 8, wherein the cooling is implemented by means of liquid mist cooling, and the coolant is one or more of water, methanol, ethanol, and acetone.

10. The method according to claim 1, wherein the contact between the waste lead paste and the barium-containing desulfurizing agent is implemented by means of a wet ball milling and mixing process.

11. The method according to claim 10, wherein the ball milling conditions include: based on 1,000 g waste lead paste, the mass of the balls is 5-500 g, the number of the balls is 5-100, the ball milling time is 0.1-200 min, and the temperature is −5° C. to 105° C.

12. The method according to claim 4, further comprising: supplementing the barium-containing desulfurizing agent into the filtrate obtained in step (1), and controlling the concentration of the barium-containing desulfurizing agent in the obtained filtrate to 90-150% of the concentration before the contact.

13. The method according to claim 8, wherein cooling the product obtained in step (2) to 100-150° C. during a period of 1-10 min following the completion of step (2).

14. The method according to claim 13, wherein the cooling is implemented by means of liquid mist cooling, and the coolant is one or more of water, methanol, ethanol, and acetone.

* * * * *